(No Model.)

R. H. LEWIS.
CLIP FOR SUPPORTING ELECTRIC CABLES.

No. 553,194.                     Patented Jan. 14, 1896.

WITNESSES:
M. F. Bligh.
Chas. H. Lutturg

INVENTOR:
Russell H. Lewis,
by Joseph A. Miller & Co.,
Atty's

UNITED STATES PATENT OFFICE.

RUSSELL H. LEWIS, OF PROVIDENCE, RHODE ISLAND, ASSIGNOR OF ONE-HALF TO OSCAR NOBLE BENDER, OF SAME PLACE.

CLIP FOR SUPPORTING ELECTRIC CABLES.

SPECIFICATION forming part of Letters Patent No. 553,194, dated January 14, 1896.

Application filed October 30, 1895. Serial No. 567,362. (No model.)

*To all whom it may concern:*

Be it known that I, RUSSELL H. LEWIS, of the city and county of Providence and State of Rhode Island, have invented a new and useful Improvement in Clips for Supporting Electric Cables; and I hereby declare that the following is a full, clear, and exact description of the same, reference being had to the accompanying drawings, forming part of this specification.

This invention has reference to an improvement in the metal bands usually secured to aerial electric cables and used to support the cables at frequent intervals from a supporting-wire.

The invention consists in the peculiar and novel construction, more fully set forth hereinafter, by which the weight of the cable tightens the clip automatically and the clip is secured and held in place more firmly.

Electric cable-clips as heretofore constructed are liable to become loose by the natural shrinkage of the cable. They are then easily displaced longitudinally by slipping on the cable and the supporting-wire when the same are swung by the wind, the longitudinal displacement being facilitated by the central depression of both the supporting-wire and the cable between the fixed supports, the cable and supporting-wire forming a succession of curved lines.

The object of this invention is to secure the clips against longitudinal displacement and so construct the clips that the weight of the cable will close the clip tightly on the cable and will automatically close on the same as the cable shrinks.

Figure 1:
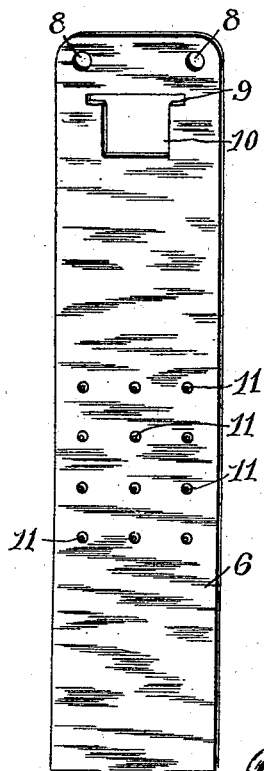
Figure 2:
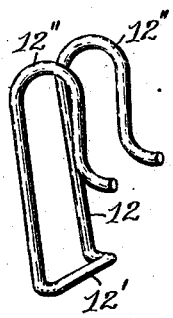
Figure 3:
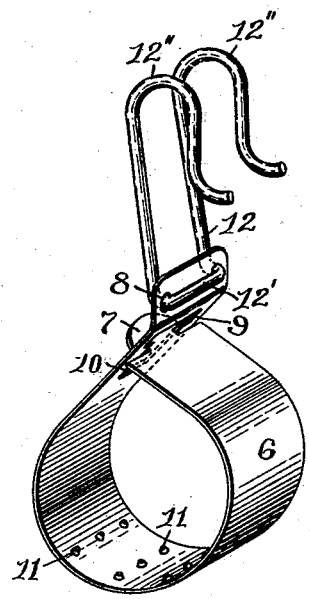
Figure 4:
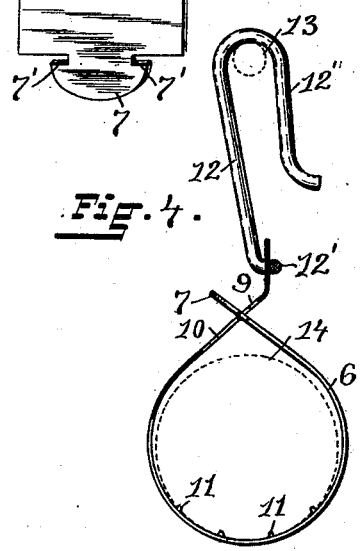
Figure 5:
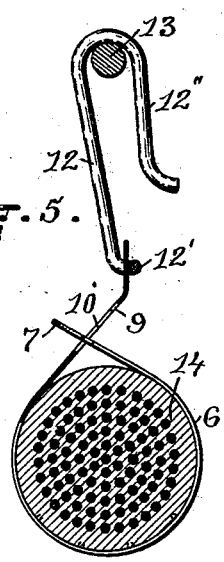

Figure 1 is a perspective view of a metal blank made to be bent to form the clip. Fig. 2 is a perspective view of the double hook used to support the clip and cable. Fig. 3 is a perspective view of the completed clip. Fig. 4 is an end view of the clip, partly in section, showing the positions the parts occupy when first secured to the cable and before the weight of the cable is supported by the clip. Fig. 5 is an end view, partly in section, showing the cable supported by the clip.

Similar numerals of reference indicate corresponding parts in all the figures.

In the drawings, 6 indicates a strip of sheet metal provided at one end with the tongue 7, on the other end with the holes 8 8, and near these with the opening 9 of a size sufficient to allow the tongue 7 to slide in the hole and have the laterally-extending portion 7' bear on the strip of metal so as to lock the tongue end of the blank in the hole 10, as is shown in Fig. 3.

In the body of the blank 6 a series of holes 11 are punched, preferably with a pointed punch, so that a portion of the metal is forced up on the side, which, when bent up, forms the inside of the clip. These projections are similar to the projecting points of a metal grater. They enter the body of the cable, as is shown in Figs. 4 and 5, and prevent the longitudinal slipping of the clip on the cable.

The clip is provided with the double hooks 12. They are bent up from a piece of wire so as to form the bar 12' and the two hooks 12'' 12''. These hooks 12 are inserted into the holes 8 8 of the clip so that the bar 12' bears against one side of the blank 6 and the hooks may be hooked over the supporting-wire 13.

14 indicates the cable.

When the clip is applied to the cable 14, the tongue 7 is inserted into the opening 9 and depressed so as to enter the contracted opening 10, as is shown in Fig. 4, the hooks are passed over the supporting-wire 13, and the cable is allowed to settle into the support of the clip. The projecting points 11 11 enter the casing of the cable 14, and the weight of the cable draws the tongue 7 downward until the cable itself prevents any further contraction of the clip.

As the cable, exposed to the varying conditions of the atmosphere, shrinks, the clip is drawn closer to the cable. This automatic adjustment of the clip to the cable secures at all times a firm hold on the cable, and, in connection with the points 11 11, prevents the slipping of the clip on the cable and secures the firm support of the cable at the desired intervals.

With the use of the improved clip the usual unsightly appearance and injurious conditions now so common in aerial electric cables, where considerable lengths of cable hang in loops between clips which have slipped apart, are avoided.

Having thus described my invention, I claim as new and desire to secure by Letters Patent—

1. In a clip, the combination with the blank 6 having at one end the tongue 7 and near the other end the opening 9—10, of the holes 8—8, and the double hook 12 constructed to support the cable and automatically adjust itself to the cable, as described.

2. In an electric cable-clip, the combination with the sheet-metal blank 6, of the holes 11—11 having the metal forced inward to form pointed projections, the tongue 7, the opening 9—10, the holes 8—8, and the double bent-wire hooks 12 the bar 12' of which bears against one side of the blank; the whole constructed to support the cable and automatically adjust the clip to the cable, as described.

In witness whereof I have hereunto set my hand.

RUSSELL H. LEWIS.

Witnesses:
   JOSEPH A. MILLER,
   B. M. SIMMS.